United States Patent [19]

Paradise

[11] Patent Number: 5,033,034
[45] Date of Patent: Jul. 16, 1991

[54] ONBOARD ACOUSTIC TRACKING SYSTEM

[75] Inventor: John W. Paradise, El Cajon, Calif.

[73] Assignee: The United States of America as represented by the Secretary of the Navy, Washington, D.C.

[21] Appl. No.: 153,820

[22] Filed: May 13, 1980

[51] Int. Cl.⁵ .............................................. G01S 3/80
[52] U.S. Cl. .................................... 367/124; 367/125; 367/127; 367/129
[58] Field of Search ............... 367/127, 129, 111, 124, 367/125, 13

[56] References Cited

U.S. PATENT DOCUMENTS

| | | | |
|---|---|---|---|
| 3,160,849 | 12/1964 | Munson | 367/118 |
| 3,312,932 | 4/1964 | Barber et al. | 367/118 |
| 3,462,729 | 8/1969 | Dapineau et al. | 367/125 |
| 3,931,607 | 1/1976 | Ingram | 367/125 |
| 3,947,803 | 3/1976 | Brown | 367/125 |
| 3,978,445 | 8/1976 | Gravett | 367/127 |
| 4,031,501 | 6/1977 | Caruso | 367/122 |
| 4,078,222 | 3/1978 | Woodruff | 367/125 |
| 4,119,942 | 10/1978 | Merklinger | 367/126 |

Primary Examiner—Daniel T. Pihulic
Attorney, Agent, or Firm—Harvey Fendelman; Thomas Glenn Keough; James O. Skarsten

[57] ABSTRACT

Apparatus located aboard a platform situated in an acoustic environment for tracking a moving body when the body is proximate to the platform. The apparatus includes a selected number of acoustic sensor elements at selected locations around the platform, each of the elements for detecting acoustic information arriving at its selected location. The apparatus further includes signal conditioners coupled to the sensor elements, a given one of the signal conditioners providing a conditioned signal representing acoustic information which is emitted by the moving body when the body is proximate to the platform, and which arrives at the location of the acoustic sensor element to which the given signal conditioner is coupled. A processor receives conditioned signals from respective signal conditioners and enables comparisons of selected characteristics of the received signals to the made in order to determine a selected parameter which is related to the movement of the body when the moving body is proximate to the platform.

13 Claims, 4 Drawing Sheets

ONBOARD ACOUSTIC TRACKING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention described and claimed herein pertains generally to apparatus which is located aboard a platform in an acoustic environment, such as a water environment, for tracking a moving body when the body is very close to the platform. More particularly, the invention pertains to apparatus located aboard a vessel for enabling the vessel to monitor the course, performance and point of impact of a torpedo or the like, which is directed at the vessel for testing or other purposes. Even more particularly, the invention pertains to apparatus of the above type wherein information related to torpedo operation is obtained by distributing a number of discrete hydrophone elements around the hull of the vessel, and comparing the strength and arrival time at different hydrophones of acoustic information which is emitted by the body or generated by the impact of the torpedo against the vessel.

In the development of a torpedo system, it is necessary to periodically test the system by directing a torpedo toward a target vessel, either a submarine or a surface vessel, and to obtain various kinds of data during the course of torpedo operation. Desired information can include the attack or aspect angle of a torpedo, i.e., its bearing as it approaches a target vessel, and the location on the target vessel at which the torpedo strikes or impacts. Knowledge of the impact point may be very useful for developing torpedo evasion tactics, as well as for refining a torpedo guidance system. Other useful or vital information includes knowledge of whether a torpedo struck its target on its first pass, or missed, turned and reattacked. If the torpedo missed, it could be important to determine whether the torpedo went over or under the target, if the target vessel was a submarine. If the torpedo missed and did not return, it could be very important to be able to determine its bearing as it passed the target vessel, in order to recover the torpedo.

A torpedo on a test run sometimes carries an internal recorder, which provides considerable information relative to its own performance if the recorder is recovered. However, it very frequently happens that when the torpedo impacts a target vessel, the recording unit is unrecoverable. All data pertaining to torpedo operation while the torpedo is in close proximity to the target is thereby lost. Even if the recording unit is recovered, there is presently no way to determine therefrom the location of impact on the target vessel. Present techniques to determine impact location are limited to asking personnel stationed at different locations on the target vessel for their respective opinions as to the point where impact occurred. Such procedure has generally been of little or no value.

The sonar system located aboard a target vessel may have some utility in tracking a distant torpedo, but has been found to be of little help in locating a torpedo impact point, or in otherwise monitoring torpedo performance close to the target vessel.

By employing the present invention, data can be generated and recorded, and then analyzed under controlled laboratory conditions, to resolve questions pertaining to attack or aspect angle and impact location. Other information which can be provided by the invention includes the history of successive active sequences of torpedo operation, closing speeds of the torpedo relative to the target, torpedo miss and reattack performance, and successive torpedo motor speed changes. The invention also enables an operator aboard the target vessel to readily approximate both aspect angle and impact location, to within several feet, right after impact occurs.

SUMMARY OF THE INVENTION

In the present invention, apparatus is provided for tracking a moving body from a platform situated in an acoustic environment in order to provide the above information, even when the body is proximate to, adjacent to, or even impacting the platform. The apparatus includes a selected number of hydrophone elements selectively distributed around the platform, each hydrophone for detecting particular acoustic information which is caused by the body, and further includes signal conditioning means coupled to each of the hydrophone elements, each of the signal conditioning means for providing a conditioned output signal which indicates the time of arrival and amplitude of the particular information at one of the hydrophone elements. Means are provided for reproducibly recording each of the conditioned output signals, and analysis means receiving the recorded conditioned output signals are provided for comparing the arrival times of the particular information at different hydrophone elements, and for comparing the amplitudes of the particular information at different hydrophone elements, to provide a selected parameter which is determined by movement of the body when the body is proximate to the platform.

The apparatus is very useful where the environment comprises a water environment, the platform comprises a vessel situated in the environment, the body comprises a torpedo or the like directed toward the vessel, for testing or other purpose, and the particular acoustic information comprises a set of high frequency acoustic signals and a set of low frequency acoustic signals. The high frequency signals are generated by a sonar pulse which is emitted by the torpedo as it approaches the vessel, and the low frequency signals are generated by motor or other noises internal to the torpedo, by interaction between the torpedo and the water environment, or by the impact of the torpedo against the vessel. Each of the signal conditioning means comprises a high frequency channel for conditioning the high frequency signals, a low frequency channel for conditioning the low frequency signals, and a means coupled to each channel output to provide a conditioned output signal which is the sum of the conditioned high and low frequency signals.

In a preferred embodiment of the invention, the number of hydrophone elements and their spacing from one another are respectively selected in relation to the dimensions of the vessel so that the arrival time and amplitude of particular acoustic information caused by the moving torpedo will be detectably different at different hydrophone elements. In such preferred embodiment, the apparatus is provided with a visual display means having arrival time and amplitude displays. The arrival time display enables an operator of the apparatus to readily determine the sequence in which different hydrophone elements have detected an impact of the torpedo against the vessel. The amplitude display comprises means for enabling the operator to readily distinguish differences in the intensity of the impact at different hydrophones.

OBJECTS OF THE INVENTION

An important object of the present invention is to enable the exact location at which a vessel in a water environment is struck by a body, such as a torpedo, to be determined.

Another object is to provide a system which significantly improves the collection of various kinds of data from which the movements and performance of a torpedo or like moving body may be determined, when such movements and performance occur in very close proximity to a vessel carrying the system.

Another object is to enable collected data of the above type to be subsequently analyzed in a controlled situation, such as in a laboratory environment.

Another object is to enable collected data of the above type to be employed to resolve questions such as those pertaining to the angle of attack of a torpedo as it approaches a target vessel, the location on the vessel at which the torpedo impacts, the successive active sequences of the torpedo when it is in proximity to the vessel, and torpedo miss and reattack information.

Another object is to enable personnel aboard a target vessel to predict the closest point of approach (CPA) of an approaching torpedo.

Another object is to enable personnel aboard a vessel to quickly approximate, to within limits which are on the order of feet, the point at which the vessel is impacted by a torpedo or like body.

Another object is to enable recovery of data pertaining to the movements and performance of a torpedo in close proximity to a vessel, even when the torpedo, the target vessel or both are lost.

These and other obJects of the invention will become more readily apparent from the ensuing specification when taken together with the drawings.

DETAILED DESCRIPTION OF THE PREFERRED EMBODIMENT

Figure 1:
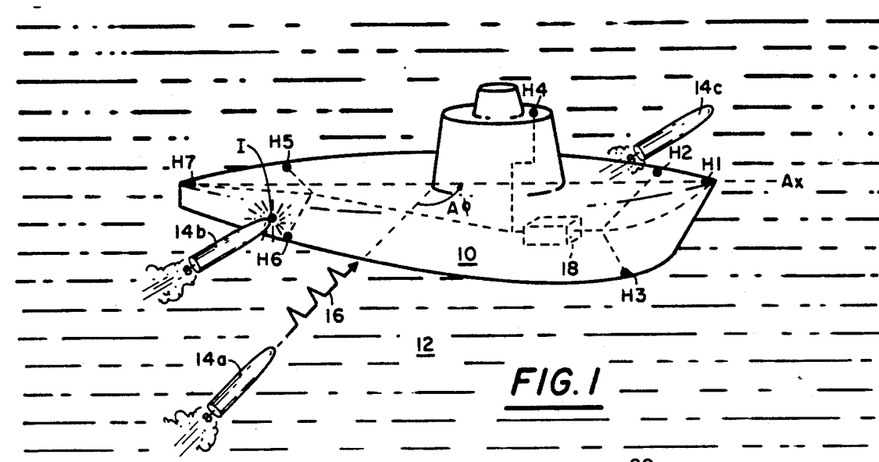
FIG. 1 is a perspective view showing an application of an embodiment of the invention.

Referring to FIG. 1, there is shown a vessel, such as a submarine 10, submerged in an underwater environment 12 to be used as a target for testing various performance characteristics of torpedos 14a–c. Torpedo 14a is shown approaching vessel 10 on an aspect angle $A_\phi$, which is measured in a horizontal plane, and with respect to $A_x$, the longitudinal axis of vessel 10. In order to locate and home in on vessel 10, torpedo 14a emits an acoustic locator signal 16, comprising a series of brief, high frequency sonar pulses, of frequency $H_f$, each having a very sharp leading edge.

By selectively locating hydrophones H1–H7 around the hull of vessel 10, the leading edge of one of the pulses of locator signal 16 will arrive at different hydrophones at times which are detectably different. If d is the distance between any two of the hydrophones which receive a locator pulse, if t is the difference in the arrival times of the locator pulse at the two hydrophones, and if $S_v$ is the velocity of sound in water, then the angle $A_\phi$ from which the pulse comes is $A_\phi = \tan^{-1}\sqrt{(d/S_v t)^2 - 1}$. By comparing the values of $A_\phi$ provided by different combinations of hydrophones receiving a locator pulse, the aspect angle of the pulse, relative to vessel 10, may be determined with great accuracy. By determining $A_\phi$ for successive pulses as torpedo 14a approaches vessel 10, the course or trajectory of torpedo 14a may be closely tracked.

Hydrophones H1–H7 are usefully spaced from one another on the order of 250 feet, and may be respectively positioned as shown in FIG. 1. However, it is to be understood that the practice of the invention is by no means limited either to such spacing or to such respective positionings, and the number of hydrophones may be either greater or less than seven.

The outputs of hydrophones H1–H7 are coupled to a signal conditioner-record system 18 aboard vessel 10, hereafter described in greater detail. System 18 conditions each hydrophone output and records conditioned outputs, whereby data provided by hydrophones H1–H7 may be subsequently analyzed, under controlled laboratory conditions. It has been found that the above process of data gathering and subsequent laboratory analysis provides extremely valuable information pertaining to the operation of a torpedo during the testing thereof.

Referring further to FIG. 1, there is shown torpedo 14b striking or impacting vessel 10 at an impact point I on the hull thereof. Upon impact, a very distinctive acoustic wave radiates from point I through vessel 10, and particularly through the hull thereof. By monitoring the amplitudes of such wave at different hydrophones, in addition to monitoring comparative times of arrival, the location of point I on the hull of vessel 10 may be very accurately determined, by means of the aformentioned recording-subsequent analysis process. It will be noted that whereas the useful information for tracking an approaching torpedo is provided by locator signal 16, which is of high frequency and narrow range, the useful information for determining impact location is provided by an acoustic impact wave having components in a frequency range which is on the order of 1 KHz–10 KHz. System 18 must therefore be capable of conditioning and recording both high frequency and low frequency acoustic data.

Referring yet again to FIG. 1, there is shown torpedo 14c missing vessel 10, and passing by over the bow thereof. When analyzing the performance of a torpedo which misses its intended target, it may be very useful or essential to know the location on the target vessel which the torpedo came closest to. Such location may be determined with great accuracy by comparing the amplitudes of torpedo motor noise which are detected by different hydrophones, since such noise rapidly decreases with distance. Such data is preserved by system 18 for future analysis. It is to be noted that motor noise, the acoustic event employed to monitor torpedo 14c, is in the aforementioned low acoustic frequency range. However, discrete occurrences of such event are not clear enough as torpedo 14c passes by to enable differences in arrival times of such event at different hydrophones to be detected.

Figure 2:
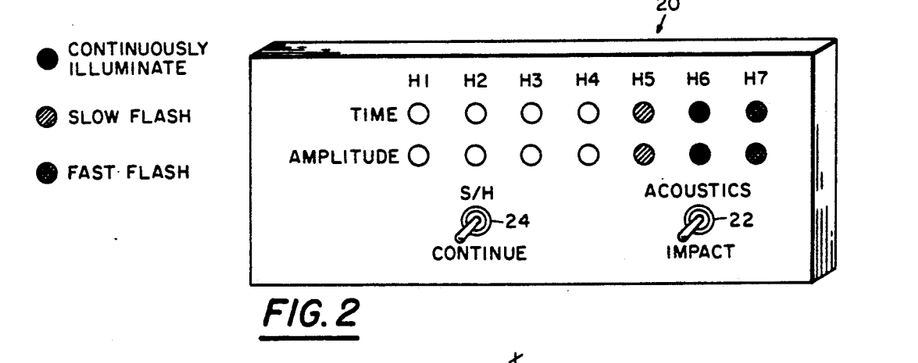
FIG. 2 is a perspective view illustrating the operation of a display panel for the embodiment of FIG. 1.

Referring to FIG. 2, there is shown a visual display 20, comprising a portion of system 18, which is provided with two rows of light elements, such as light emitting diodes or the like. The upper row comprises a TIME row, and the lower row comprises an AMPLITUDE row, one element in each row corresponding to a different hydrophone H1-H7. Panel 20 is provided to enable an observer aboard vessel 10 to readily approximate, from a particular pattern of light element illumination, the impact point of an impacting torpedo or the position on vessel 10 to which a passing torpedo comes closest. When a distinctive acoustic event occurs proximate to vessel 10, the light element in the TIME row which corresponds to the first hydrophone to receive the event is steadily illuminated, the light element corresponding to the second hydrophone to receive the event slowly flashes on and off, and the third hydrophone to receive the event rapidly flashes on and off. In like manner, the light elements of the AMPLITUDE row corresponding to the hydrophones at which the amplitude of an acoustic event is first, second, and third greatest, respectively, are steadily illuminated, are slowly flashed on and off, and are rapidly flashed on and off. Generally, to predict closest point of approach (CPA) of an approaching torpedo, illumination of the TIME row is most significant. To determine the impact point of an impacting torpedo, the illumination of both rows is significant and is generally identical or very close. To determine the closest point to the vessel of a torpedo missing the vessel, the illumination of the AMPLITUDE row is generally most significant.

FIG. 2 shows the illumination of panel 20 which occurs upon the impact of torpedo 14b, and enables a trained observer viewing the panel to readily approximate the impact point, to within a range which may be on the order of feet. Panel 20 is provided with a selector switch 22, which is set to "IMPACT" when impact is being monitored, and which is set to "ACOUSTICS" when an approaching torpedo is being monitored. When panel 20 is in its "ACOUSTIC" mode, a selector switch 24 may be set to operate panel 20 in either a "SAMPLE/HOLD" mode or a "CONTINUOUS" mode.

Figure 3:
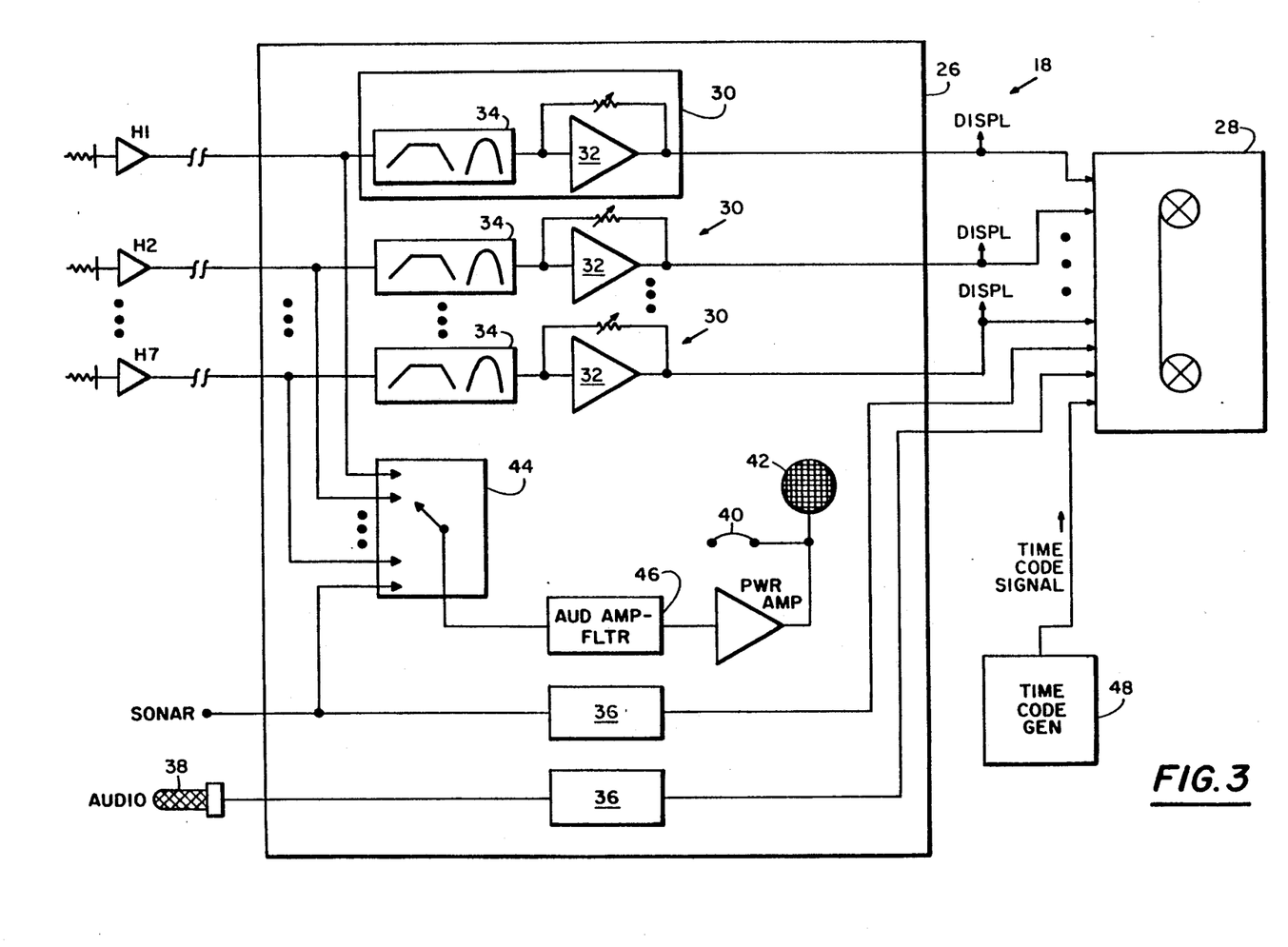
FIGS. 3 and 4 are simplified schematic diagrams which cooperatively show the embodiment of FIG. 1.

Referring to FIG. 3, there is shown conditioner-record system 18 comprising two main components, signal conditioner 26 and a multi-channel data recording system 28, such as an FR1300 Ampex 14-channel tape recorder. Signal conditioner 26 is provided with seven data conditioning channels 30, each receiving the output of one of the hydrophones H1-H7. Each conditioning channel 30 includes a 20 db to 60 db compression amplifier 32, for amplifying its received hydrophone output, and a filter 34, for selectively filtering its received hydrophone outputs, to provide a conditioned output which is recorded as data on one of the channels of recorder 28. Since, as aforementioned, the frequency components of significant acoustic events in torpedo monitoring may be in either a narrow high acoustic frequency range or a wide low frequency range, each conditioning channel 30 must be capable of separately conditioning both high frequency and low frequency information, and of then summing the conditioned high frequency and low frequency information to provide a conditioned output for recording by recorder 28.

The output of each signal conditioner is also coupled to comparator electronics of panel 20 for illuminating light elements thereof to represent acoustic information detected by hydrophones $H_1-H_7$, as hereinbefore described.

Referring further to FIG. 3, there is shown signal conditioner 26 including a channel 36 for amplifying information provided by a sonar system which is carried aboard vessel 10, such sonar information being coupled to recorder 28. Conditioner 26 also includes a channel 36 for amplifying audio information coupled thereto from a microphone 38. Microphone 38 is provided to receive comments pertinent to an acoustic event which are made either by an observer of panel 20, or by one listening to a hydrophone channel or to vessel sonar. Since such comments are made upon the occurrence of an event, they may have great value for subsequent laboratory analysis of torpedo performance.

A hydrophone H1-H7 or vessel sonar is selectively listened to, either by means of headphones 40 or speaker 42, by adjustment of a selector switch 44. Audio information passes thereto through audio amplifier-filter 46.

Referring yet again to FIG. 3, there is shown a time code generator 48, located aboard vessel 10, coupling a time code signal to recorder 28. By recording such time code signal, data pertaining to the performance of a torpedo 14 which is provided by hydrophones H1-H7 may be analyzed in relation to the movements of submarine 10 or other events which are concurrent with torpedo operation.

Figure 4:
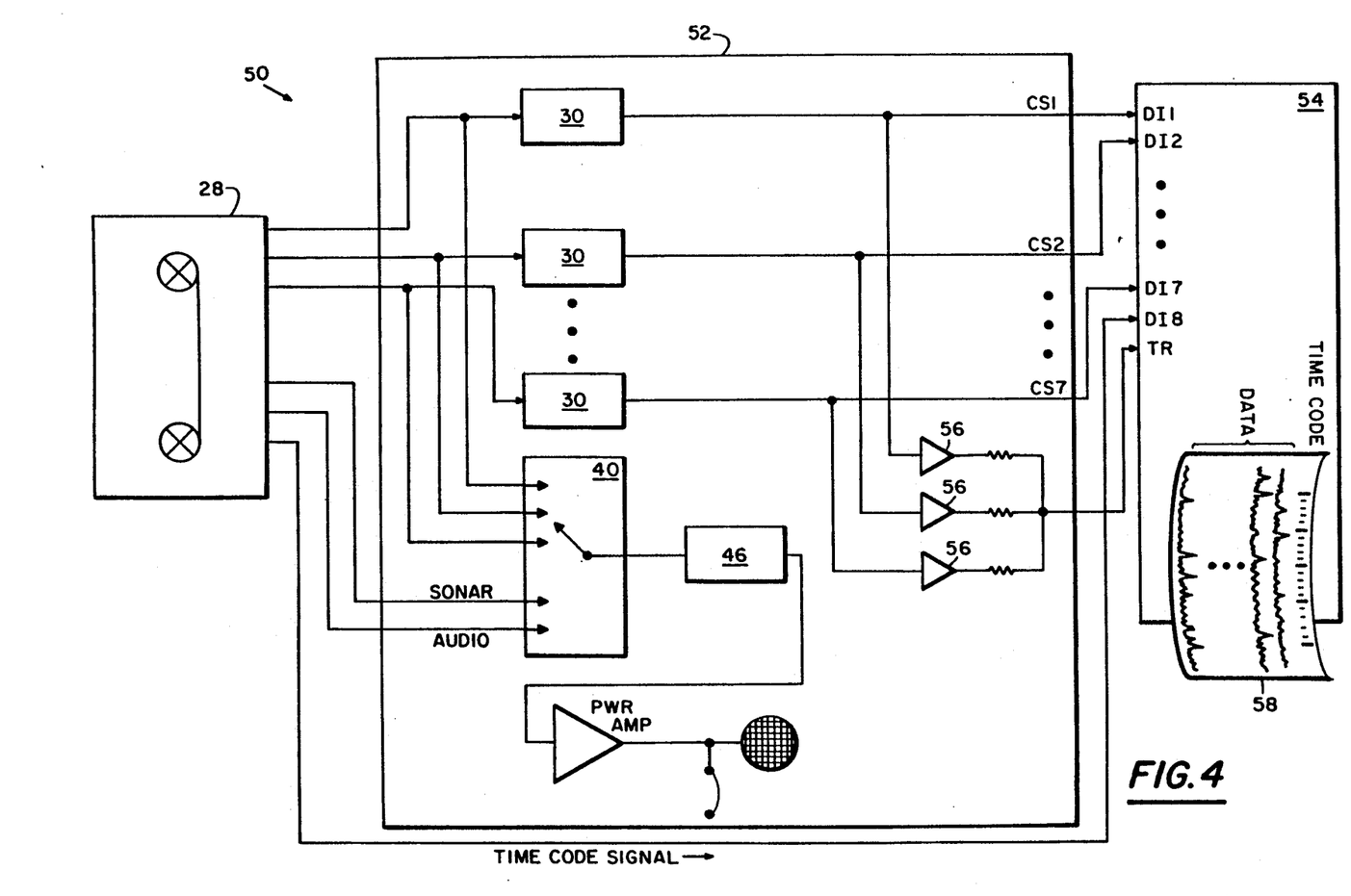

Referring to FIG. 4, there is shown a data analysis system 50 comprising recorder 28, a signal conditioner 52, and a device 54, such as a visacorder, for providing a graphic representation of data previously recorded on respective channels of recorder 28. Signal conditioner 52 is similar to conditioner 26, and includes seven conditioning channels 30. Each channel 30 receives a conditioned output from recording system 28 when system 28 is operated in a reproduce mode, to eliminate tape recorder noise from the received output. The outputs of the conditioning channels 30 of signal conditioner 52 comprise conditioned hydrophone output signals CS1-CS7. Each signal CS1-CS7 is coupled through a mixer amplifier 56 to the triggering terminal TR of device 54, device 54 being activated when a pulse is coupled to its triggering terminal which exceeds a selected threshold. Referring further to FIG. 4, there is shown each signal CS1-CS7 coupled to a different data input terminal DI1-DI7 of device 54, the aforementioned time code signal being coupled from recorder 28 to data input terminal DI8 of device 54. When device 54 is activated, it graphically represents the data received at each of its data input terminals on a readout 58, which may comprise a strip of photosensitive paper. The above triggering threshold is set so that it is reached when the amplitude of one of the signals CS1-CS7 corresponds to the amplitude of an acoustic event previously sensed by one of the hydrophones, which was generated by torpedo operation in proximity to vessel 10. Device 54 is therefore activated by a signal corresponding to the output of the first hydrophone to detect such event. By comparing data graphically represented by device 54 after activation, the respective times at which the event arrived at other hydrophones may be readily determined. Comparative amplitudes of a signal detected by different hydrophones are also provided by the graphic representation of device 54, and a concurrent representation of the time code enables rapid determination of the actual time at which a hydrophone detected an event.

Figures 5, 6:
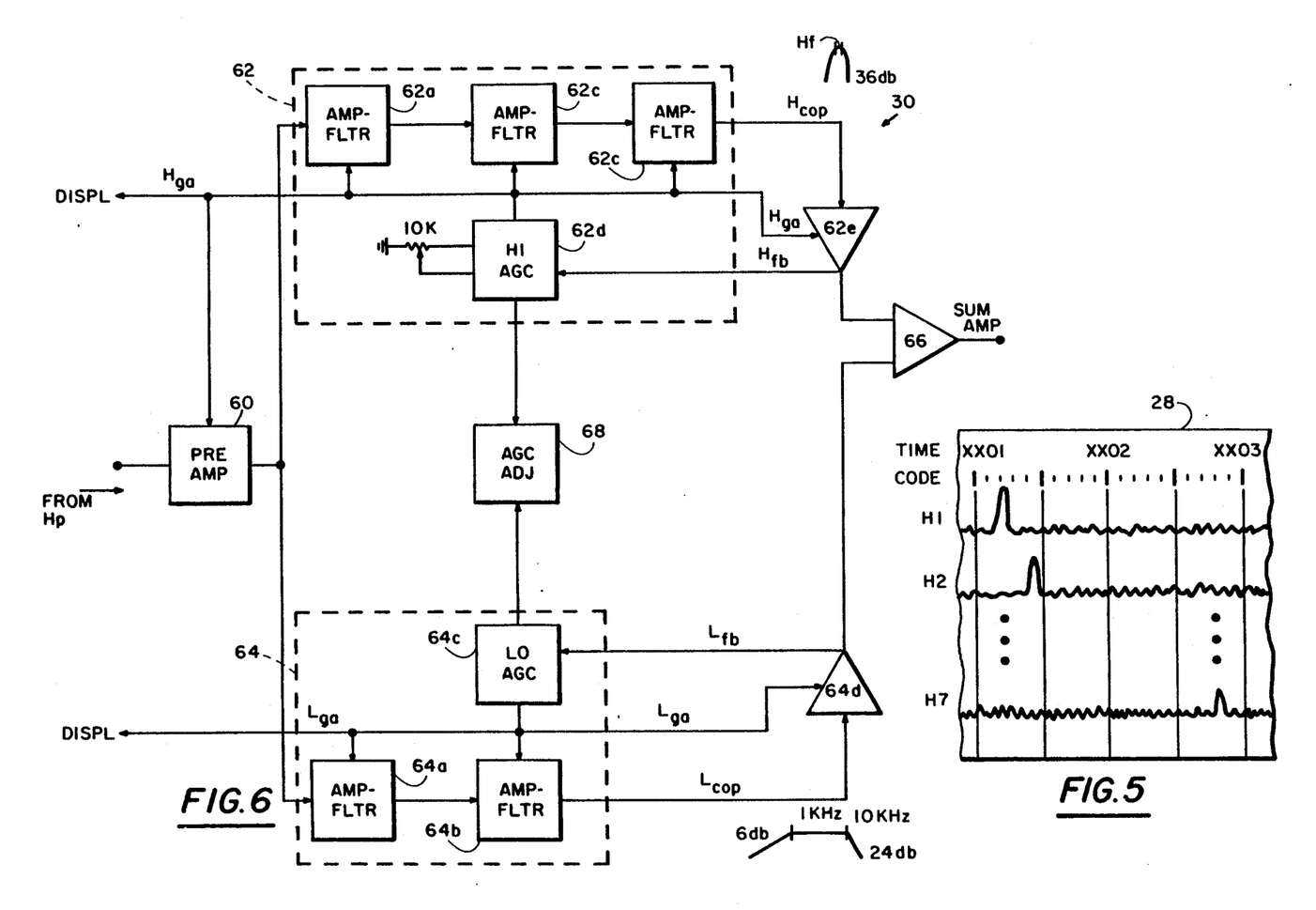
FIG. 5 illustrates a form in which data is provided by an embodiment of the invention.
FIG. 6 is a schematic diagram for showing a signal conditioner channel for the embodiment of FIG. 1 in greater detail.

Referring to FIG. 5, there is shown a selected segment of readout 58. FIG. 5 indicates that, for example, just after a time indicated by the time code signal to be XX01, an event, such as a torpedo impact, was detected by hydrophone H1. Thereafter, the event arrived at other hydrophones, with diminishing amplitudes. From readout 58, the differences in arrival times and amplitudes of the event at different hydrophones may be very precisely determined. By employing such information together with a simple triangulation formula, the location of impact of a torpedo on vessel 10 may be determined with great accuracy.

As an alternative to visacorder 54, signals CS1-CS7 may be coupled to a counting device to determine, to within milliseconds, the differences in arrival times of an acoustic signal at different hydrophones.

Referring to FIG. 6, there is shown a conditioning channel 30 of conditioner 26 receiving the output of one of the hydrophones, such output being coupled to a preamp 60 for initial amplification, the output of the preamp being coupled to both a high frequency conditioning channel 62 and a low frequency conditioning channel 64. High frequency channel 62 includes three 12 db filter-compression amplifier stages 62a-c for providing an output centered at a frequency $H_f$ which rises and falls at 36 db. Channel 62 further includes a high frequency automatic gain control (AGC) 62d for regulating the gain of stages 62a-c, the output of filter 62c comprising a high frequency conditioned signal $H_{cop}$, coupled to amplifier 62e. The output of amplifier 62e, $H_{fb}$, is fed back to AGC 62d, the sensitivity thereof being adjustable by means of a 10K resister coupled thereto.

In like manner, low frequency channel 64 comprises interconnected compression amplifier-filter stages 64a and 64b and low frequency AGC 64c, the output of filter 64b comprising a low frequency conditioned output signal $L_{cop}$, coupled to amplifier 64d. Channel 64 provides a pass band over the range 1-10 KHz, which rises at 6 db and falls off at 24 db. Low frequency automatic gain control 64c regulates the gain of stages 64a and 64b and amplifier 64d in response to a signal $L_{fb}$, the sensitivity of AGC 64c being adjustable by means of a 10K resistor coupled thereto.

The high frequency output and low frequency output of amplifiers 62e and 64d, respectively, are coupled to summing amplifier 66 to provide the total conditioned output of a channel 30. The threshold of AGC 62d is usefully set to 1 volt RMS, and the threshold of AGC 64c is usefully set to 0.5 volts RMS. By such respective settings, the respective contributions of the low and high frequency channels to the total conditioned output of a channel 30 can be very readily distinguished when the total conditioned output is graphically represented by device 54.

Referring further to FIG. 6, there is shown an automatic gain control adjustment 68, which is provided for setting the attack and release times for both AGC 62d and AGC 64c. Since the principle high frequency acoustic event monitored by hydrophones H1-H7 is a brief high frequency locator pulse, it is important that attack time, or time required to reset the gain of stages 62a-62c, be very, very fast, so that high amplification can be provided the instant a locator pulse is detected.

At the same time, it is important that the release or recovery time of AGC 62d be very short, so that the gains of stages 62a-62c are diminished just as soon as the locator pulse ends and hydrophones H1-H7 are only receiving ambient noise. The release or recovery time of AGC 62d, set by adjustment 68, should therefore be on the order of milliseconds. On the other hand, the significant low frequency events monitored by hydrophones H1-H7 are impact waves and torpedo motor noise. Since such events may continue over a period on the order of seconds, it is necessary for adjustment 68 to provide AGC 64c with a recovery time on the order of seconds.

A high frequency gain adjust signal $H_{ga}$ is coupled from AGC 62d to amplifiers 62a-62c and 62e to control the respective gains thereof. Similarly, a low frequency gain adjust signal $L_{ga}$ is coupled to amplifiers 64a-64b and 64d to control the gains thereof. In addition, signals $H_{ga}$ and $L_{ga}$ are coupled to an electronics package controlling the illumination of panel 20. The electronics package, not shown, comprises any suitable circuit configuration having the capability of comparing the signals provided by different conditioning channels 30, and of selecting the three of such signals which are the first to reach the panel electronics and/or which have the greatest amplitudes. The display electronics could, for example, include a configuration of flip-flops and sample/hold circuits, or, alternatively, a selectively programmed microprocessor.

Figures 7, 8:
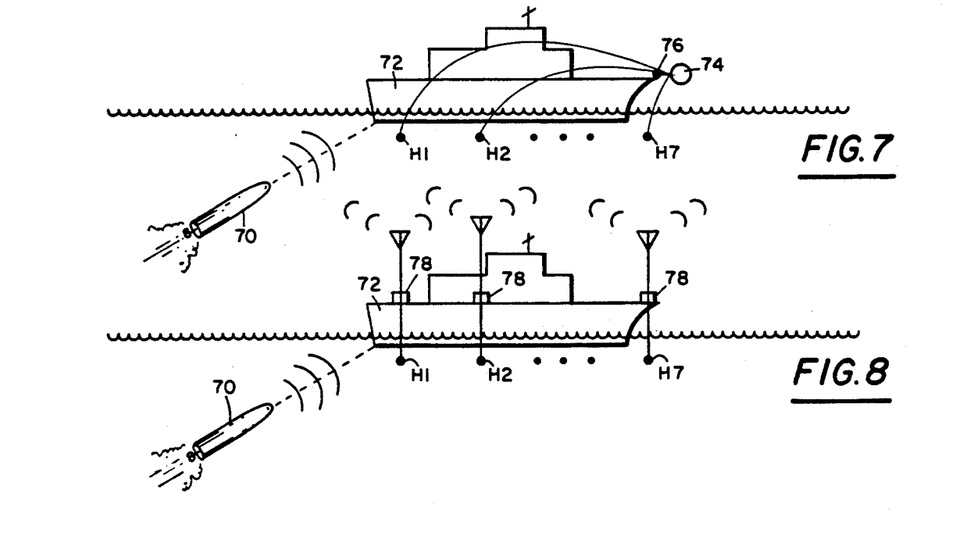
FIGS. 7 and 8 are perspective views illustrating modifications of the embodiment of FIG. 1.

Referring to FIG. 7, there is shown a modification of the invention which is useful for monitoring the performance of a torpedo 70 during a test which requires that torpedo 60 sink an expendable unmanned target vessel 72. In such modification, a number of hydrophones H1-H7 are selectively positioned around the hull of vessel 72 to detect a locator signal or other acoustic information provided by torpedo 70. The outputs of each of the hydrophones are coupled to a conditioner-recorder 18 which is contained in a buoyant protective container 74. A coupling 76 detachably joins container 76 to vessel 72 so that upon the impact of torpedo 70 against vessel 72, container 76 is enabled to break clear of vessel 72. Coupling 76 may comprise, for example, an explosive bolt system activated by impact. Container 76 may be subsequently recovered for analysis of data contained within recorder 28.

Referring to FIG. 8, there is shown a second modification of the invention, wherein information provided by a torpedo 70 proximate to an unmanned expendable vessel 72 is detected by a selected array of hydrophones, the output of each hydrophone being coupled to a transmitter device 78 which transmits a signal representing the hydrophone output. For example, the hydrophone output could modulate a carrier wave generated by a device 78. Also, each hydrophone and transmitter 78 could comprise a standard sonobuoy.

Obviously, many other modifications and variations of the present invention are possible in the light of the above teachings, and, it is therefore understood that within the scope of the disclosed inventive concept, the invention may be practiced otherwise than as specifically described.

What is claimed is:

1. Apparatus for tracking a moving body from a platform situated in an acoustic environment when the body is proximate to the platform, said apparatus comprising:

a number of acoustic sensor elements at selected locations around said platform, each of said elements for detecting acoustic information arriving at its selected location;

a signal conditioning means uniquely coupled to each of said acoustic sensor elements, a given one of said signal conditioning means comprising means for providing a conditioned signal which selectively represents the amplitude and time of arrival of particular acoustic information which is generated by action of said moving body when said moving body is proximate to said platform, and which arrives at the location of the acoustic sensor element to which said given signal conditioning means is coupled; and comparing means receiving conditioned signals from said signal conditioning means for enabling said conditioned signals to be respectively compared, in order to provide selected information which is related to operation of said body when said body is proximate to said platform.

2. The apparatus of claim 1 wherein said environment comprises a water environment, said platform comprises a vessel situated in said water environment, and said body comprises a mechanical body operating in proximity to said vessel, and wherein;

said comparing means comprises means for enabling the amplitudes of said particular acoustic information at different sensor elements to be selectively compared with one another and for enabling the times of arrival of said particular acoustic information at different acoustic sensor elements to be selectively compared with one another.

3. The apparatus of claim 2 wherein said moving body approaches said vessel on a particular aspect angle when said moving body is proximate to said vessel, and wherein:

said comparing means comprises means for enabling said aspect angle to be determined from said comparisons.

4. The apparatus of claim 3 wherein said moving body impacts said vessel at a particular location on said vessel, and wherein:

said comparing means comprises means for enabling said location of impact to be determined to within a selected limit from said comparisions.

5. The apparatus of claim 4 wherein;

said comparing means includes visual display means for enabling an operator of said apparatus to readily compare by observation the times of arrival of said particular acoustic information at different acoustic sensor elements, and to readily compare by observation the amplitudes of said particular acoustic information at different acoustic sensor elements.

6. The apparatus of claim 5 wherein:

the number and the spacing of said acoustic sensor elements are respectively selected to be sufficient, in relation to the dimensions of said vessel, to enable an operator of said apparatus to quickly approximate said impact location to within a limit which is on the order of feet.

7. The apparatus of claim 2 wherein:

said comparing means includes recording means for reproducibly recording each of said conditioned signals, together with selected supplementary information.

8. Apparatus for tracking a moving body from a platform situated in an acoustic environment when the body is proximate to the platform, said apparatus comprising:

a selected number of hydrophone elements to be selectively distributed around said platform, each of said hydrophones for detecting specific acoustic events which are generated by activity of said body;

signal conditioning means coupled to each of said hydrophone elements, each of said signal conditioning means for providing a conditioned output signal which selectively represents the time of arrival and amplitude of one of said events at one of said hydrophone elements;

means for reproducibly recording conditioned output signals; and analysis means receiving said recorded conditioned output signals for enabling comparison of the arrival times of one of said events at different hydrophone elements, and for enabling comparison of the amplitudes of one of said events at different hydrophone elements, to provide a selected parameter which is determined by movement of said body when said body is proximate to said platform.

9. The apparatus of claim 8 wherein said environment comprises a water environment, said platform comprises a vessel situated in said environment, and said body comprises a mechanical body directed through said environment toward said vessel, wherein said acoustic events can include a set of high frequency acoustic signals and a set of low frequency acoustic signals, and wherein each of said signal conditioning means comprises:

a high frequency channel for conditioning the acoustic signals of said high frequency set;

a low frequency channel for conditioning the signals of said low frequency set; and means coupled to each of said channels for providing a conditioned output signal which comprises the sum of said conditioned high frequency signals and said conditioned low frequency signals.

10. The apparatus of claim 9 wherein said high frequency signals include sonar pulses emited by said body and said low frequency signals comprise signals generated by internal noise of said body and by the impact of said body against said vessel, and wherein:

said high frequency channel comprises a high frequency filter means for providing a conditioned high frequency output having a narrow band width centered at the frequency of said sonar pulses, compression amplifier means, and a high frequency automatic gain control coupled to said high frequency amplification means for setting the gain of said high frequency channel to a first preselected level; and said low frequency channel comprises a low frequency filter means for providing a conditioned low frequency output having a band width which substantially comprises the band width of said set of low frequency signals, low frequency amplification means, and a low frequency automatic gain control coupled to said low frequency amplification means for setting the gain of said low frequency channel to a second selected output level, said second output level being less than said first output level.

11. The apparatus of claim 10 wherein:

said high frequency automatic gain control has a recovery time which is on the order of milliseconds, and said low frequency automatic gain control has a recovery time which is on the order of seconds.

12. The apparatus of claim 9 wherein:

the number of said hydrophones and the distribution of said hydrophones around said vessel are selected in relation to the dimensions of said vessel so that the arrival times of some of said acoustic events are detectably different at different hydrophones, and so that the amplitudes of some of said acoustic events are detectably different at different hydrophones; and said apparatus includes visual display means receiving the outputs of said high frequency and said low frequency channels for enabling an observer to determine upon inspection the order in which a selected number of hydrophones detected a particular acoustic event.

13. The apparatus of claim 12 wherein:

said visual display means includes a first row of light elements and a second row of light elements, one of the light elements in each of said rows corresponding to a different one of said hydrophones, light elements of said first row being steadily activated, slowly activated and deactivated, and rapidly activated and deactivated to respectively indicate the hydrophones which are first, second and third to receive an acoustic event when the arrival times of said acoustic events are detectably different at different hydrophones, light elements of said second row being steadily activated, slowly activated and deactivated, and rapidly activated and deactivated to respectively indicate the hydrophones at which the amplitude of an acoustic event is greatest, second greatest and third greatest, when the amplitude of the acoustic event is detectably different at different hydrophones.

* * * * *